June 9, 1964 P. MILJANIC 3,136,937

SPEED CONTROL OF WOUND ROTOR INDUCTION MOTOR

Filed Jan. 29, 1962 5 Sheets-Sheet 1

INVENTOR.
PETAR MILJANIC

BY

Douglas S. Johnson
Attorney

June 9, 1964  P. MILJANIC  3,136,937
SPEED CONTROL OF WOUND ROTOR INDUCTION MOTOR
Filed Jan. 29, 1962  5 Sheets-Sheet 2

INVENTOR.
PETAR MILJANIC
BY
Douglas S. Johnson
Attorney

June 9, 1964 P. MILJANIC 3,136,937
SPEED CONTROL OF WOUND ROTOR INDUCTION MOTOR
Filed Jan. 29, 1962 5 Sheets-Sheet 3

INVENTOR.
PETAR MILJANIC
BY
Douglas S. Johnson
Attorney

June 9, 1964    P. MILJANIC    3,136,937
SPEED CONTROL OF WOUND ROTOR INDUCTION MOTOR
Filed Jan. 29, 1962    5 Sheets-Sheet 4

INVENTOR.
PETAR MILJANIC
BY
Douglas S. Johnson
Attorney

June 9, 1964 P. MILJANIC 3,136,937
SPEED CONTROL OF WOUND ROTOR INDUCTION MOTOR
Filed Jan. 29, 1962 5 Sheets-Sheet 5

INVENTOR.
PETAR MILJANIC
BY
Douglas S. Johnson
Attorney

United States Patent Office 3,136,937
Patented June 9, 1964

3,136,937
SPEED CONTROL OF WOUND ROTOR
INDUCTION MOTOR
Petar Miljanic, Belgrade, Yugoslavia, assignor to John
Inglis Co., Limited, Toronto, Ontario, Canada
Filed Jan. 29, 1962, Ser. No. 169,998
Claims priority, application Yugoslavia Jan. 31, 1961
8 Claims. (Cl. 318—197)

This invention relates to improvements in the speed control of electrical induction machines. More particularly the invention is concerned with achieving a constant torque speed control in wound rotor induction motors while enabling the speed of such motors to be continuously varied or varied in steps and very closely controlled from normal maximum speed in one direction to normal maximum speed in the reverse direction. Further the invention relates to the achieving of a fine speed control in wound rotor induction motors under load overhauling conditions and motor braking.

In the simplest form of speed control for wound rotor induction motors adjustable external resistances are added to the rotor winding circuit but because of the power dissipation in the resistance and hence inefficiency such systems are not acceptable for the control of drives required to run at constant reduced speeds under constant load. Furthermore such a system is incapable of providing a constant reduced speed under variable load conditions because of the poor speed-torque motor characteristics inherently involved where such resistances are employed.

Various systems have been developed with a view to overcoming the defects of the inefficiencies and lack of speed control with load variations inherent in the simple resistance controlled wound rotor induction motor and for example the Ward-Leonard and Ward-Leonard-Ilgner sets employing direct current motors are now the most widely used and most satisfactory means known for obtaining accurate speed control under varying load conditions over a wide range of forward and reverse speeds.

Such a set however consists of at least three main machines all of which must be fully rated, and two of which are costly direct current machines which generally require separate exciters associated with them which in turn require a constant voltage source, generally a third exciter. Thus such a set leads to six separate machines to provide fully flexible large output drives, and the cost of such a set is therefore high. Moreover, due to the inherent difficulties of commutation, such devices for very large outputs are limited to low speeds, and step down gearing, to achieve high output from smaller higher speed machines which would materially save on costs, is precluded.

It is therefore the object of this invention to provide a highly efficient wound rotor induction motor speed control system which will enable the motor speed to be varied continuously (or if desired step by step) from normal maximum speed in one direction to normal maximum speed in the reverse direction while at the same time enabling the motor speed to be very closely controlled at any selected speed within such range under varying load conditions, and which while affording all of the speed control advantage of the best Ward-Leonard sets will be very much simpler and less expensive.

Another important object is to achieve such a highly efficient speed control as aforesaid in a system involving only one rotating machine, and even further involving a single rotating machine which has no commutator and is more dependable than a comparable D.C. machine.

In this connection it is again an important object to provide an efficient reliable speed control system as aforesaid while affording very major reductions in the size of the system as compared to present acceptable systems thereby leading to important new wound rotor induction motor applications.

In this connection because no commutator machine is required the present invention overcomes one of the serious limitations of the present much more expensive Ward-Leonard systems due to the difficulty of commutation at high speeds and large powers.

Further it is an object of the invention to provide a relatively simple wound rotor induction motor speed control affording the very high degree of speed control and speed stability as aforesaid while at the same time providing such control adapted to achieve accurately controlled speed with high stability where the motor is required to handle an overhauling load or is to be used as a brake.

Another important object is to enable the aforesaid speed control to be achieved through the use of compact components of very low power rating.

According to the invention the speed control system comprises means for rectifying the rotor electrical output of a wound rotor induction motor, and means for inverting the rectified rotor output and applying same to the motor supply over a selectively variable portion of the cycle of the supply voltage. In this connection, according to the preferred form of the invention, such speed control of a wound rotor induction machine as aforesaid is achieved by rectifying the electrical output of the rotor windings, applying such rectified output to an inverter connected to the A.C. supply while providing for a controlled by-passing of the rectified rotor current to control the timing and duration of connection of the rectified output to the line through the inverter and hence to regulate the energy transfer from the rotor to the supply.

More particularly according to the preferred form of the invention the inverter is arranged to connect the rectified rotor output to the A.C. supply, commencing at a time immediately preceding a voltage zero at the point of connection and the inverter is by-passed at a time variable from a point immediately after inverter-to-supply coupling for maximum normal motor speed affording in effect rotor short circuit conditions to a point subsequent in time up to the end of the inverter conducting cycle for reduced motor speeds, the extent of such by-pass time delay determining the reduction of motor speed. In this connection, further according to the invention, the point of rectified rotor output to supply coupling through the inverter is preferably maintained fixed and the rectified rotor output by-pass only is varied to afford speed control.

These and other objects and features will be more fully understood from the following detailed description taken in conjunction with the accompanying drawings, in which FIGURE 1 is a diagram representing typical speed-torque curves for a wound rotor induction motor regulated by addition of external resistances;

Figure 6:
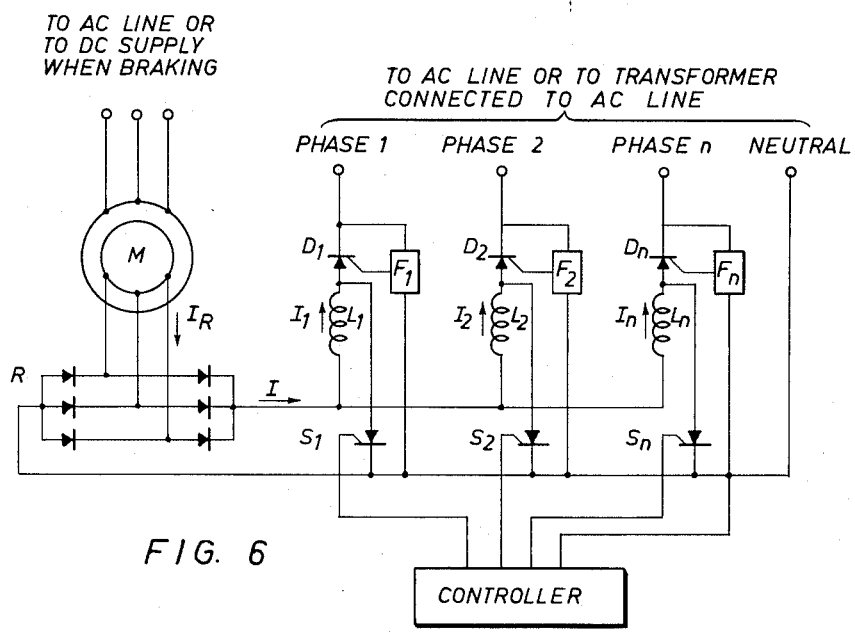
FIGURE 6 is a wiring diagram of a typical speed control circuit according to the invention in which one inverter element and one gate element are utilized per phase.
Figure 7:
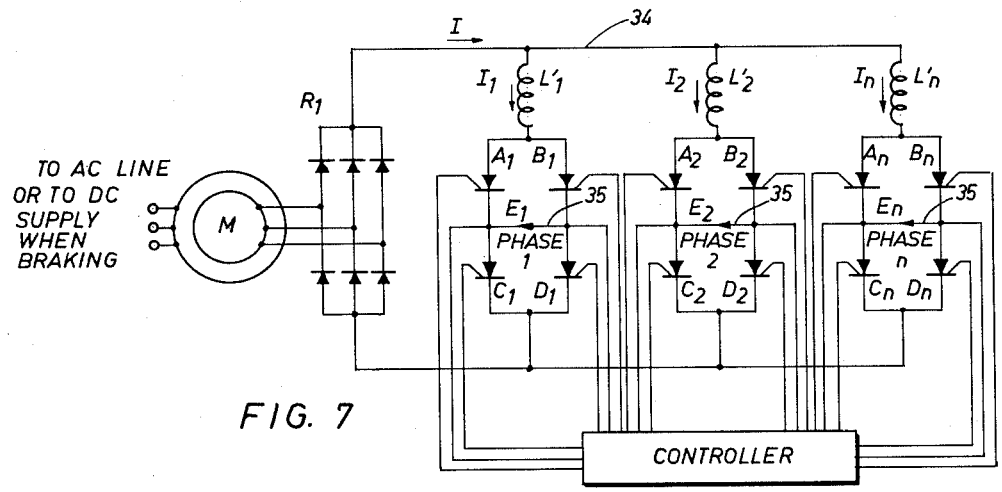
FIGURE 7 is a wiring diagram of a modified speed control circuit embodying the invention wherein a composite inverter-gate bridge is employed in each rotor phase.
Figure 8:
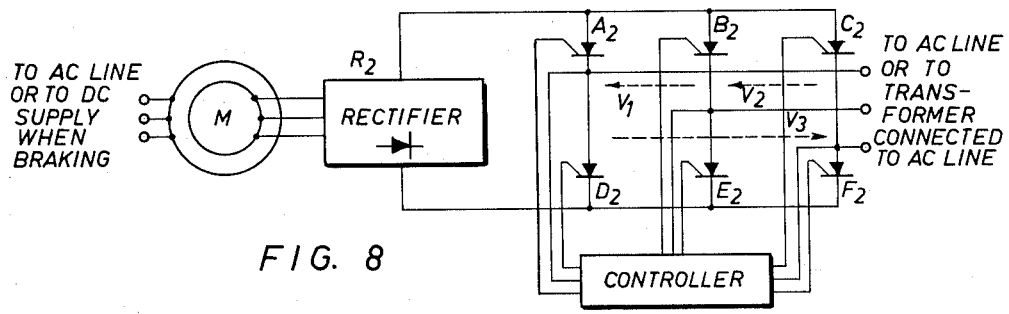
FIGURE 8 is a wiring diagram of a further modified form of speed control circuit embodying the invention wherein a single composite multiple-phase, e.g. 3-phase, inverter-gate bridge is employed.
Figure 9A:
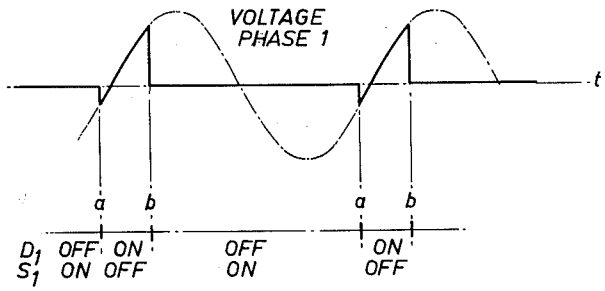
Figure 9B:
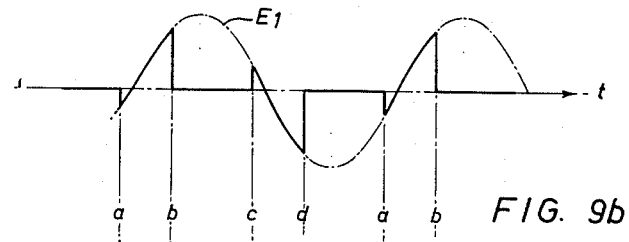
Figure 9C:
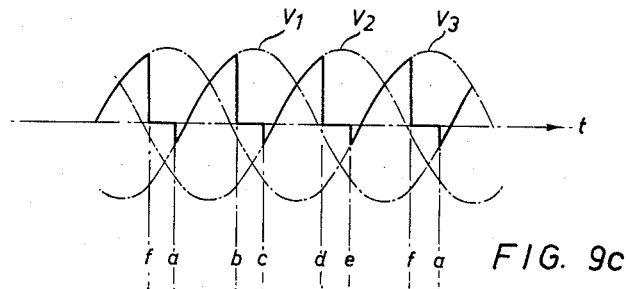
Figure 10:
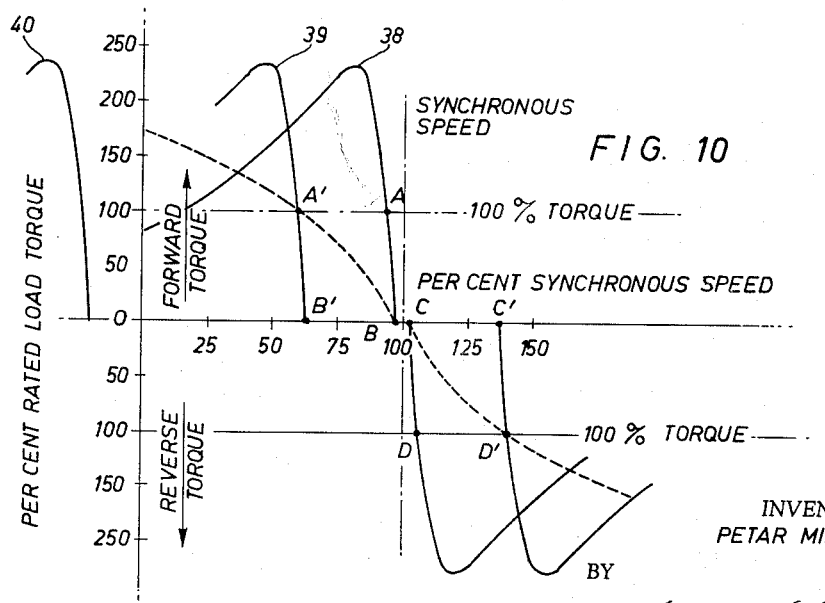

FIGURES 9(a), 9(b) and 9(c) are diagrams illustrating the firing sequences for the inverters and controlled gates with respect to line voltage for the speed control systems of FIGURES 6, 7 and 8 for typical intermediate motor speed settings;

FIGURE 10 is a diagram of the torque speed characteristics of a wound rotor induction motor under overhauling, braking, and regenerating conditions when the speed control is by external resistances (dotted line curves) and when the speed is controlled by use of a rectifier-inverter-gate system according to the invention (solid line curves).

Figure 1:
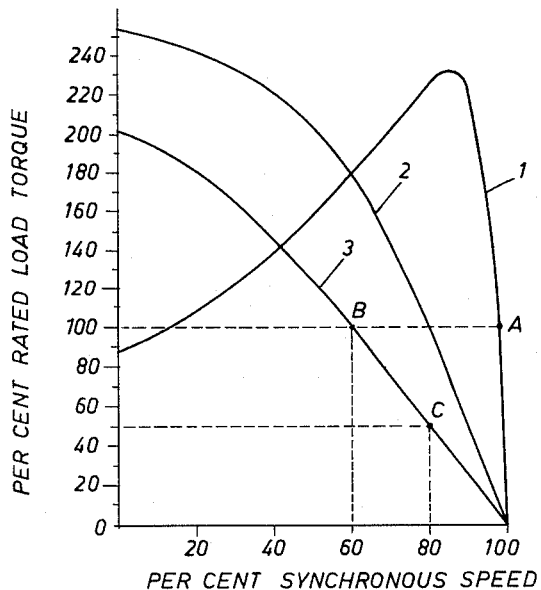

With reference first to FIGURE 1, this figure illustrates the speed-torque curves of the ordinary wound rotor induction motor where speed is varied by the addition of rotor resistance and where speed control at any value is determined by the inherent characteristic of the rotor-external resistance circuit. Curve 1 is the speed-torque characteristic with no external resistance and curves 2 and 3 represent such characteristics, with 20% and 40% added resistance respectively. At full load and normal speed operation, point A, as a result of the steep front on the characteristic, a rise or drop in torque due to change of load results in only a small change in speed, and therefore the control is good.

When operating at reduced speed and, say, full load torque, point B, a similar percent change in torque produces a very much greater change in speed. The lower the operating speed, the more pronounced is the speed change per unit torque change, and thus there is a very poor speed control, as distinct from the ability to vary the speed. Also, the lower the operating speed is made for a given torque, the greater are the losses in the control resistance and the lower is the efficiency.

Figure 2A:
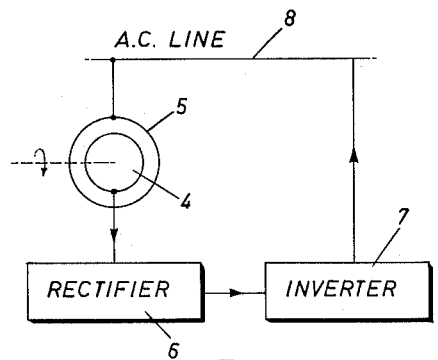
FIGURE 2(a) is a block diagram illustrating a speed control system wherein the rotor output of a wound rotor induction motor is rectified and connected to the A.C. supply line through an inverter the firing point of which is adjustable.

It has been proposed to control the motor speed without the disadvantages of external resistance by injecting an external electromotive force into the rotor circuit through the use of a rectifier connected to rectify the rotor output and coupled to the A.C. supply line by means of an inverter. FIGURE 2(a) shows such a system relating to the present invention and in this system the variable frequency, variable voltage rotor current from the wound rotor 4 of an induction motor 5 is rectified by rectifier 6 to variable voltage D.C. which is then inverted by inverter 7 to constant voltage A.C. and fed back to the line 8. The firing point of the inverter rectifiers is controlled through adjustable phase shifters of any known type.

Figure 2B:
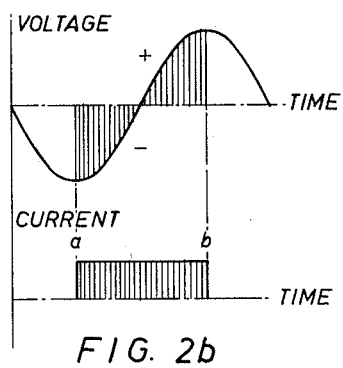
FIGURE 2(b) is a diagram illustrating the voltage and current relationships present when the inverter of FIGURE 2(a) is set to fire or conduct to enable the motor of FIGURE 2(a) to operate at varying torques and at normal speed.

When operating at full load torque and normal speed, corresponding to point A in FIGURE 1, the firing point (for one phase) would be set at "a" as shown in FIGURE 2(b) and the inverter continues to conduct until point "b" one half cycle later. Then on average no energy is fed to the line and the inverter presents zero voltage to the rectifier: as a result the rotor behaves as though it were short circuited and the motor speed is controlled closely by its own inherent characteristic as before.

Figure 2C:
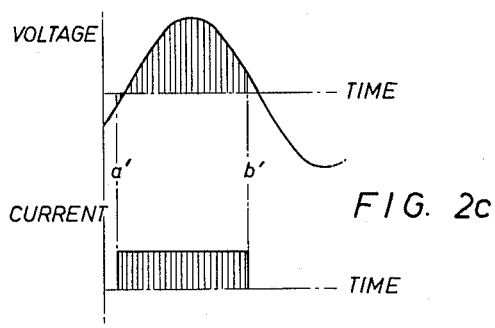
FIGURE 2(c) is a diagram similar to FIGURE 2(b) but with the inverter of FIGURE 2(a) set to fire or conduct to enable the motor of FIGURE 2(a) to operate at varying torques and at a reduced speed.
Figure 3:
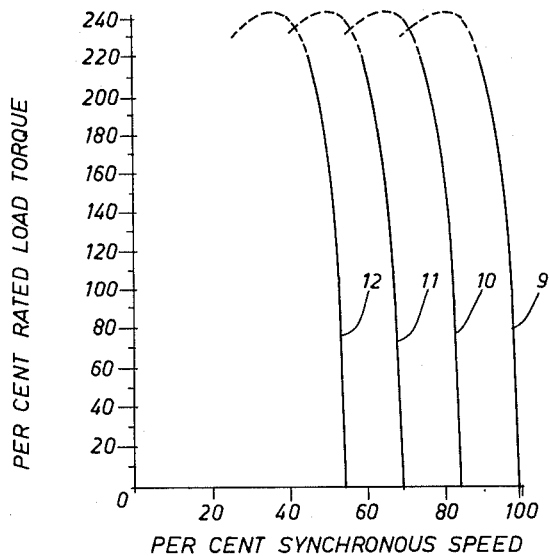
FIGURE 3 is a diagram representing the speed-torque curves for the wound rotor induction motor having the speed control arrangement of either FIGURE 2(a) or FIGURE 5(a)

When the firing of the inverter rectifiers is set at $a'$ and continues to point $b'$ as in FIGURE 2(c) in order to make the motor operate at a reduced speed, then on average energy is fed to the line during alternate half-cycles. The inverter presents a portion of the line volts to the rectifier, tending to reduce the current flowing in the rotor. This, in turn, tends to reduce the torque and the rotor speed falls to such a value that the resulting increased voltage generates sufficient current in the rotor to maintain the torque. Thus the effect is to reproduce the characteristic of the motor with its own resistance only, at the lower speeds. Thus, in place of the curves of FIGURE 1, the characteristics of this system are as shown in FIGURE 3, and it will be seen from these characteristic curves 9, 10, 11 and 12 that the good speed control of the full-load normal speed characteristics becomes available at all speeds and torques.

While the use of the rectifier and controlled inverter provides both highly satisfactory speed control and speed stability such a speed control system has an economic limitation in that when used in the upper part of the motor speed range as illustrated in FIGURE 2(b), while on average no energy is fed to the line, nevertheless large currents which are effectively in quadrature with and leading the line voltage are fed through the inverter 7 to the line 8. This has the same effect as drawing a lagging current of equal value and thereby significantly reduces the power factor of the motor when running at normal full load torque speed, under which conditions it ought to operate at its maximum power factor.

It is therefore, an important aspect of the present invention to provide a speed control system for wound rotor induction motors which will not only give excellent speed control and speed stability fully equivalent to the system of FIGURE 2(a), without the inefficiencies and losses inherent in systems using external resistances, but will further preclude any undesirable impairment of the power factor of the motor throughout the full range of speed control.

Figure 5A:
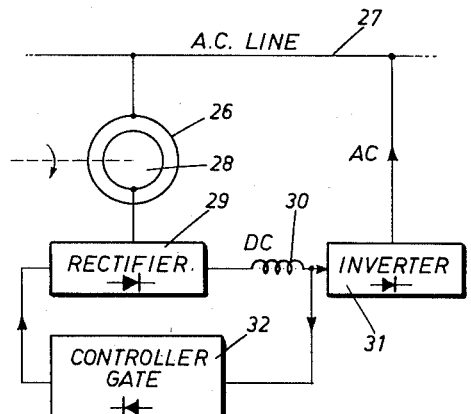
FIGURE 5(a) is a block diagram illustrating a speed control system according to the invention wherein a controlled gate by-pass is used in conjunction with a rectifier and inverter inserted between the rotor and the A.C. line.

According to this important aspect of the present invention such speed control and stability without resistance losses or power factor impairment is achieved by providing in conjunction with the rectifier and inverter of FIGURE 2(a) a controlled gate connected across the rectifier to enable the output of the rectifier to be by-passed without going through the inverter over varying periods according to the motor speed desired. In its simplest diagrammatic form this aspect of the invention is illustrated in FIGURE 5(a) wherein the motor 26 is connected to the A.C. supply line 27 and the output from the rotor 28 which comprises a variable frequency variable magnitude alternating current voltage is rectified by the rectifier 29 which may be comprised of any of the well known rectifiers such as silicon rectifiers and choke 30. Connected between the output of the rectifier 29 and the line 27 is an inverter 31 again which may be formed of any suitable electrical-mechanical components such as power transistors, silicon controlled rectifiers, gas tubes, or mechanical rectifiers and means for controlling or firing such components. Connected across the rectifier 29 is a controlled gate 32 which again may for example be comprised of suitable components such as power transistors, silicon controlled rectifiers, gas tubes, or mechanical rectifiers and means to control or fire such components. In the latter case, the means for firing the gate 32 will be adjustable and may comprise for example a peaking transformer fed by a voltage whose phase relation to the line voltage may be adjusted as for instance through a selsyn motor, magnetic amplifier or the like. In the case of the inverter 31 the inverter conducting component may be fired by, for example, a peaking transformer fed by a voltage whose phase relationship to the line voltage may be fixed at least during normal operation. It will be understood however that various other control or firing means may be employed and the invention is not to be limited to the use of any specific components or circuitry.

Figure 5B:
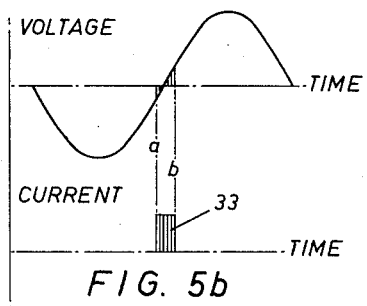
FIGURE 5(b) is a diagram illustrating the voltage and current relationships obtaining when the system of FIGURE 5(a) is arranged to enable the motor to operate at varying torques and normal speed.
Figure 5C:
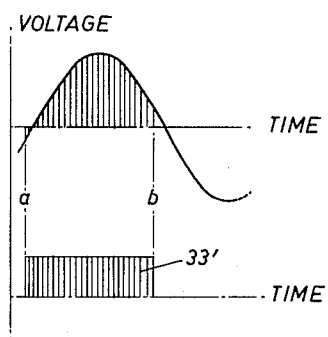
FIGURE 5(c) is a diagram similar to FIGURE 5(b) but with the system of FIGURE 5(a) arranged to enable the motor to operate at varying torques and at a reduced speed.

With the system of FIGURE 5(a) the inverter 31 is set to fire at point "a" in the line voltage cycle as shown in FIGURE 5(b). When the motor is to operate at normal speed the controlled gate 32 is arranged to fire at point "b," FIGURE 5(b) immediately after the firing of the inverter. The inverter thereupon ceases to conduct and the rotor circuit is completed through the controlled gate 32. Thus only a small pulse of current 33, FIGURE 5(b) is fed back to the line, and the power factor is not impaired. When operation at a reduced speed is required, the controlled gate is set to fire at point b', FIGURE 5(c) while the inverter continues to fire at point "a," so that the bulk of the current is fed to the line and only a small pulse passes through the controlled gate. Here the current 33 fed back to the line is in phase with line voltage so that energy transfer takes place. Once set, the firing points of the inverters remain the same under various conditions of operation in this case, and only the firing point of the controlled gate is altered.

The speed-torque curves for a motor controlled by the system of FIGURE 5(a) also can be represented by the typical curves 9, 10, 11 and 12 of FIGURE 3 but such speed control is achieved throughout the entire range without the impairment of the power factor presented by the motor to the line, that is, the motor including the control system.

Figure 4:
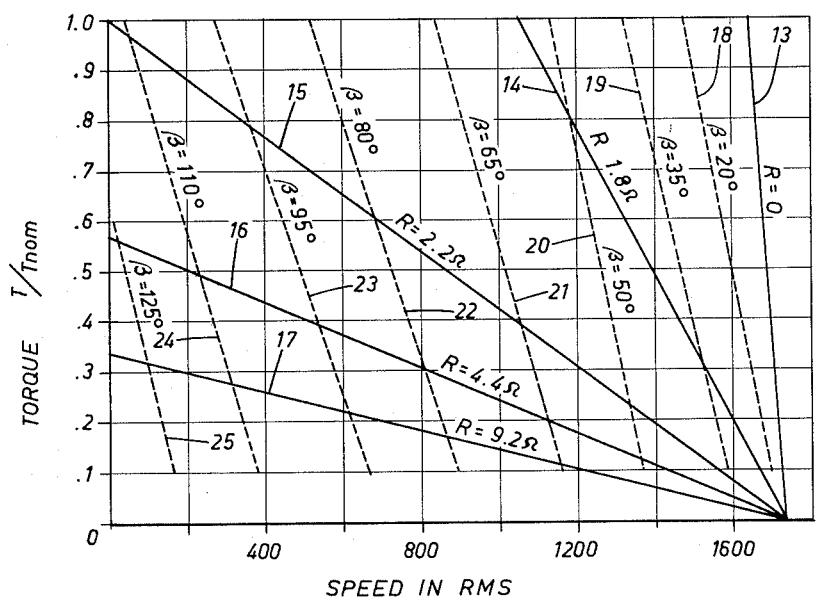
FIGURE 4 is a diagram comparing the speed-torque characteristics of a typical wound rotor induction motor controlled by resistances (full lines) and by the use of the rectifier-inverter-by-pass system of FIGURE 5(a) inserted between the rotor and the A.C. supply line (dotted lines)

In FIGURE 4, there are shown curves 13, 14, 15, 16 and 17 plotted from tests made on a 2 H.P. wound rotor motor controlled by the insertion of resistances in the rotor circuit, and curves 18 to 25 plotted from tests made on the same motor when controlled by a rectifier-inverter by-pass circuit according to FIGURE 5(a) in which the firing angle (B) of the by-pass was varied.

In FIGURE 6 there is illustrated a typical speed control system for a multi-phase wound rotor induction motor where the neutral point is accessible and employing one inverter element and one controlled gate element per phase.

In FIGURE 6 the variable frequency variable voltage rotor output is rectified in a 3-phase bridge-connected rectifier R to give variable voltage direct current which is delivered through chokes $L_1$, $L_2$, and $L_n$ to the inverters $D_1$, $D_2$, and $D_n$ or to the controlled gates $S_1$, $S_2$, and $S_n$. Here $D_1$, $D_2$, and $D_n$ are the inverter elements and $S_1$, $S_2$ and $S_n$ are the controlled gates forming the by-passes. The firing points of $D_1$, $D_2$, and $D_n$ are fixed and controlled by the elements $F_1$, $F_2$, and $F_n$; the firing points of $S_1$, $S_2$, and $S_n$ are variable and are controlled by the element C. These elements "F" and "C" can be made up in a number of established ways, such as peaking transformers to produce a firing pulse fed by a voltage whose phase relationship to the line voltage is fixed in the case of "F" and adjustable in the case of "C." The firing sequences for the inverters and controlled gates with respect to the line voltage for a given selected motor speed are shown in FIGURE 9(a).

It will be apparent that should it be desired to increase motor speed the controlled gate S, of phase 1 will be adjusted to shift the point "b" in FIGURE 9(a) towards the point "a" and vice versa for decreased motor speed. In all cases the current delivered to the supply line is such that the power factor of the motor is not deleteriously affected.

While FIGURE 9(a) shows the relationships obtaining in phase 1 of the system of FIGURE 6 it will be understood that other corresponding relationships will obtain in the other phases.

FIGURE 7 illustrates the application of the invention using a composite inverter-gate bridge in each phase of an n-phase (e.g. 3-phase) wound rotor induction motor.

In FIGURE 7 a 3-phase bridge connected rectifier R' is used to give a variable voltage direct current from the rotor currents. This rectified current is fed to a D.C. bus 34 and depending on which of the supply phase voltages is suitable in regard to amplitude and polarity at each given instant, the direct current from R' is fed through chokes $L_1$, $L_2$, and $L_3$ in turn.

Consider phase 1 with current $I_1$, FIGURE 7, entering through choke $L_1$. When acting as an inverter, $B_1$ and $C_1$ are in the non-conducting state while $A_1$ and $D_1$ are fired so that the current passes through $A_1$ to the line 35 and back to $D_1$ and thence to the other side of the rectifier R'. When the polarity of the line voltage is opposite to that assumed, then $A_1$ and $D_1$ are non-conducting, so that current passes through $B_1$—line 35—$C_1$—to rectifier R'.

When operating as a controlled gate (by-pass) the current path is completed through $A_1$ and $C_1$, with $B_1$ and $D_1$ non-conducting, or vice versa.

The inverter-gate bridges in the other two phases operate in a similar way in succession.

The firing sequences for inverter and gate operation are shown with respect to line voltage in FIGURE 9(b).

Again the control of the firing of the controlled gates or by-passes will achieve the requisite speed control without power factor impairment.

While in FIGURES 6 and 7 inverter-gate devices are shown employed in each phase, it will be understood that such inverter-gate devices may be employed in a single phase only, or in two-phase only, the only adverse effect being some resulting voltage unbalance in the supply to the motor which in many instances may be insignificant.

FIGURE 8 illustrates another embodiment of the invention utilizing a single composite three-phase inverter-gate bridge generally designated at 36 controlled by a controller 37. In the arrangement of FIGURE 8 the rotor currents are rectified by rectifier $R^2$ and fed to a D.C. bus 35'.

When the unit 36 is operating as an inverter rectifiers $A^2$ and $E^2$ first conduct and all other rectifiers are blocked; then $B^2$ and $F^2$ conduct while all other rectifiers are blocked; then $C^2$ and $D^2$ conduct with all other blocked.

When the unit 36 is operating as a controlled gate the rectifiers conduct in such a way as to provide a path in turn through the rectifiers $A^2$ and $D^2$, $B^2$ and $E^2$, and $C^2$ and $F^2$, it being understood that when one path is open, e.g. the path through A², D², the other paths will be blocked.

FIGURE 9(c) illustrates the details of the firing sequence of the rectifiers with respect to line voltage for a given motor speed, the firing being adjustable to change the time the unit 36 acts as a by-pass gate to change rotor speed in accordance with the invention.

In the event that a wound rotor induction motor having a speed control system according to the invention and set to power a load at normal maximum speed encounters an overhauling load which tends to drive the motor, the motor speed will increase slightly to the sub-synchronous maximum as the torque drops off, and then continue to increase through and beyond the synchronous speed as the overhauling torque increases. Then the subsequent behavior follows that of the normal induction generator and the overall combined characteristic is shown in FIGURE 10 as path ABCD. Beyond point C, FIGURE 10, the motor builds up a reverse counter torque to oppose that of the overhauling load, and at a speed which is as much above synchronous speed as the normal full load maximum speed is below synchronous speed this counter torque becomes equal to normal full load torque. Throughout the CD portion of the characteristic, the wound rotor machine is generating and feeding power back to the line.

If the motor and control scheme have been set to operate at, for example, a reduced speed—e.g. point A' of FIGURE 10—then when overhauling occurs, a similar process takes place, the combined characteristic being A'B'C'D'.

It is another feature of a control system of the present invention that the speed-torque characteristics—e.g. curves 38 and 39 in FIGURE 10—can be shifted through the zero speed point to, for example, the curve 40 at which point the motor can be used as a brake at reversed speed.

Where a wound rotor motor is controlled by external rotor resistance, the corresponding characteristics are identical for the normal full speed setting and follow curves such as the dotted A'BC D' curve for reduced speed settings.

Again if it is required to brake the motor incorporating a speed control embodying the invention, either to combat an overhauling effect, or for other reasons in either direction of rotation, this may readily be achieved by switching the motor stator to a D.C. supply—either from a rectifier or a separate source. Under these conditions the control characteristics of the present invention are completely retained and the motor is effectively braked at the constant set speed. This, for example, would have considerable merit in the case of a crane drive. Under these conditions, of course, regeneration takes place since A.C. is generated in the rotor of the motor and fed back through the rectifier and inverter to the line.

It will be understood that where it is desired that the motor speed be varied from normal maximum speed in one direction to normal maximum speed in the reverse direction there will be provided the usual means for automatically interchanging the connections of two phases of the motor when the motor speed drops to zero.

Thus the invention provides a highly efficient, relatively inexpensive, reliable, simple, compact means, essentially without power losses or power factor impairment, of enabling the speed of alternating current motor operation to ve varied continuously (or step by step) over a range from full forward to full reverse speed. Moreover, the invention permits the motor speed to be set by low power control devices at any value within the above range and controlled at that value within fine limits under varying load conditions. All such advantages furthermore are available without any limitation being imposed by the difficulty of commutation at high speeds and large powers.

While specific embodiments of the invention have been illustrated it will be understood that many variations in component and circuit arrangements may be made by those skilled in the art without departing from the spirit of the invention or scope of the appended claims.

In this connection it will be understood that the control system according to the invention may be used independently or combined with other electrical arrangements. For instance, if high motor starting torque is required, then separate resistances can be connected across the rotor during starting to provide such high torque and further to avoid overloading the rectifying and inverting devices.

What I claim is:

1. The combination with a wound rotor induction motor having a stator for connection to an alternating current supply and a wound rotor, means connected to said rotor for rectifying the electrical output of said rotor, means for inverting the output of said rectifying means and connecting same to the motor's alternating current supply, gate controlled path means providing a by-pass for the output of said rectifying means by-passing said inverting means, and means controlling the gate of said gate controlled path means.

2. A speed control system for a wound rotor induction motor comprising in combination with a wound rotor induction motor and an alternating current supply therefor, of rectifier means connected to said rotor to rectify the rotor electrical output, gate controlled path means for affording a path for rectifier current to said alternating current supply, gate controlled path means for providing a rectifier current by-pass path by-passing the aforesaid gate controlled path means, and means for controlling the gates of each of said paths.

3. A speed control system for a wound rotor induction motor comprising in combination with a wound rotor induction motor and an alternating current supply therefor, of rectifier means connected to said rotor to rectify the rotor electrical output, a first gate controlled path means for affording a path for rectifier current to said alternating current supply, a second gate controlled path means for providing a rectifier current by-pass path by-passing the aforesaid gate controlled path means, means opening the gate of said first gate controlled path means at a fixed point relative to the cycle of the alternating current supply, and means for opening the gate of said second gate controlled path means at a variable point in the alternating current supply cycle.

4. A speed control system as claimed in claim 3 in which said means opening the gate of the first gate controlled path means is arranged to open the gate of said first path means at a point in the alternating current supply cycle commencing substantially immediately preceding the alternating current voltage zero at the point of connection to the alternating current supply.

5. A speed control system as claimed in claim 4 in which said means opening the gate of the second gate controlled path means is operable to open said second path means over a continuously variable range commencing at least from a point immediately subsequent to the opening of the gate of said first path means.

6. A speed control system for a polyphase wound rotor induction motor comprising in combination with a wound rotor induction motor and a polyphase alternating current supply therefor, of means for rectifying the electrical rotor output and delivering such rectified output to a direct current bus, a first gate controlled path from said bus connected to at least one phase of the alternating current supply, a second gate controlled by-pass path connected across said rectifying means for such phase, means for opening the gate of said first path at a point fixed relative to the supply cycle, and means for opening the gate of said second path at a time selectively variable relative to the supply cycle.

7. A speed control system for a polyphase wound rotor induction motor comprising in combination with a wound rotor induction motor and a polyphase alternating current supply therefor, of means for rectifying the rotor electrical output, and delivering such rectified output to a direct current bus, and gate controlled path means in at least one phase for selectively connecting said bus to the alternating current supply and a by-pass return to said rectifying means, the duration of connection through said by-pass return path being selectively variable.

8. A speed control system for a polyphase wound rotor induction motor comprising in combination with a wound rotor induction motor and a polyphase alternating current supply therefor, of a rectifying means for rectifying the rotor electrical output, and delivering such rectified output to a direct current bus, and gate controlled path means for selectively connecting said bus to each phase of the alternating current supply and a by-pass return path of each phase to said rectifying means, the duration of connection through said by-pass return paths being selectively variable.

References Cited in the file of this patent

UNITED STATES PATENTS

| | | |
|---|---|---|
| 2,442,261 | Boyer | May 25, 1948 |
| 2,442,262 | Boyer | May 25, 1948 |
| 2,707,258 | Boyer | Apr. 26, 1955 |

FOREIGN PATENTS

| | | |
|---|---|---|
| 822,044 | Great Britain | Oct. 21, 1959 |
| 875,669 | Great Britain | Aug. 23, 1961 |